United States Patent [19]
Koronka et al.

[11] 3,845,730
[45] Nov. 5, 1974

[54] AGRICULTURAL APPARATUS

[75] Inventors: Paul Koronka, Upwaltham; Richard John Hirst, Billingshurst, both of England

[73] Assignee: Imperial Chemical Industries Limited, London, England

[22] Filed: Dec. 7, 1973

[21] Appl. No.: 422,785

Related U.S. Application Data

[63] Continuation of Ser. No. 210,057, Dec. 20, 1971, abandoned, which is a continuation-in-part of Ser. No. 874,909, Nov. 7, 1969, abandoned.

[30] Foreign Application Priority Data
Nov. 28, 1968 Great Britain.................... 56473/68

[52] U.S. Cl..................... 111/88, 172/413, 172/705
[51] Int. Cl............................................... A01c 5/06
[58] Field of Search............. 111/77, 73, 85, 80, 88, 111/87; 172/707, 705, 413, 462

[56] References Cited
UNITED STATES PATENTS

| | | | |
|---|---|---|---|
| 2,726,464 | 12/1955 | White et al. ..................... | 172/413 X |
| 2,813,712 | 11/1957 | Stanis................................. | 267/63 |
| 3,228,363 | 1/1966 | Gardner et al..................... | 111/88 X |
| 3,331,341 | 7/1967 | Harting.............................. | 111/73 |
| 3,439,749 | 4/1969 | Olsson ........................... | 172/707 X |
| 3,507,233 | 4/1970 | Greig et al.......................... | 111/85 |
| 3,513,790 | 5/1970 | Olsson ............................... | 111/88 |

*Primary Examiner*—Stephen C. Pellegrino
*Attorney, Agent, or Firm*—Cushman, Darby & Cushman

[57] ABSTRACT

A seed drill comprising a plurality of soil-working members mounted on drag bars which are pivotally mounted on the frame of the seed drill, in which loading is applied to the drag bars to urge the soilworking members into the soil and in which the loading is transmitted to the drag bars through rubber springs.

4 Claims, 2 Drawing Figures

PATENTED NOV 5 1974 3,845,730

AGRICULTURAL APPARATUS

This is a continuation of application Ser. No. 210,057, filed Dec. 20, 1971, now abandoned, which is a continuation-in-part of Ser. No. 874,909, filed Nov. 7, 1969, now abandoned.

This invention relates to spring loading means for a soilworking member forming part of an agricultural apparatus and in particular a soilworking member forming part of a seed drill.

A seed drill as used at the present time comprises a frame, ground wheels, a hopper or seedbox for seed and a number of soilworking members, for example knives or coulters each of which opens a slot in the earth into which the seed is placed. In general the soilworking members are mounted on drag bars which are pivotally mounted on the frame and which can be lowered to engage the soil or can be raised into an inoperative position. In order to force the soilworking members into the soil, some form of loading, for example hydraulic loading, is applied to each member through a coil spring. The spring ensures that the soilworking member follows the contour of the ground, and that a uniform seeding depth is maintained.

The use of a coil spring is attended by certain disadvantages. The rating of springs required for a heavy soil, for example, differs from that required for a light soil, so that more than one set of springs is usually required for use with the seed drill. The exchange of a set of springs for those of a different rating is a time consuming and laborious operation, involving the disassembly and reassembly of a large number of parts. Furthermore, in order to bring the springs into a suitable attitude with respect to the coulters, it is necessary to provide a rigid superstructure on the frame, against which the springs can act. The presence of this superstructure interferes with the most convenient positioning of the seed box, which is preferably located above the coulters, and makes it necessary, for example, to provide longer conduits for the seed.

We have now devised a new method of springloading a soilworking member forming part of an agricultural apparatus, which avoids several of the disadvantages of previously known springloading means.

According to the present invention there is provided agricultural soilworking apparatus comprising a frame, having pivotally mounted thereon a drag bar carrying a soilworking member, and adapted to carry spring means arranged so as to be capable of acting on the drag bar to urge the soilworking member into the soil, characterized in that the spring means is a rubber spring.

The agricultural apparatus is preferably a seed drill. Preferably the seed drill comprises several, for exaMple, 12 to 15, drag bars carrying soilworking members. In a preferred form of seed drill, the soilworking member comprises a rotatably mounted disc or coulter which is arranged to cut a slit in the ground, and one or more rotatably mounted discs disposed to widen the slit so formed. Conveniently, two rotatably mounted slit widening discs are used. Seed is preferably introduced into the slit by a tube connected to the hopper and opening between a pair of adjacently mounted slit widening discs.

A convenient form of rubber spring for use in agricultural apparatus according to the invention has the general form of a cone having a rounded apex. A particularly suitable form of rubber spring is that sold under the name of "Metalastic" ("Metalastik" is a Trade mark) in which the rubber cone is bonded to a metal back plate.

This type of rubber spring is especially effective when the loading applied to the drag bar through the spring is produced by the weight of the vehicle frame to which the rubber spring is attached. In this case an adjustment to the loading may be accomplished by adjusting the height of the vehicle's ground wheels vis-a-vis the vehicle's frame.

A specific embodiment of the invention will now be described with reference to the accompanying drawing, in which.

Figure 1:
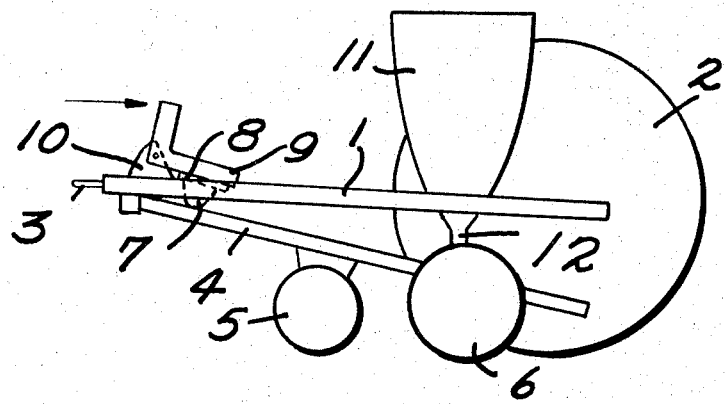
FIG. 1 is a schematic side view of a seed drill in which a rubber spring is urged to a drag arm by a bell crank pivoting on a bracket attached to the frame.

Referring now to the drawings, in FIG. 1 a frame 1 is supported by ground wheels 2 and carries a towing hitch 3 for attachment to a tractor. The frame 1 pivotally mounts a number of drag bars 4. Each bar 4 carries a slit cutting and widening device comprising a single small leading coulter 5 followed by a pair of angled coulters 6. A conical rubber spring bonded to a base plate 8 is urged on to the drag bar 4 by a bell crank lever 9 pivotally mounted on a bracket 10. Pressure is applied to the bell crank lever in the direction shown by the arrow by any convenient means, preferably by means of a hydraulic cylinder (not shown). A hopper 11 is mounted above the coulters 6 and has a seed tube 12, opening between the coulters 6. In operation, the seed drill is towed behind a tractor. The loading on the drag bars 4 is set for example by operation of a hydraulic cylinder connected to the bell crank lever 9. Each leading coulter 5 cuts a slit which is widened by the pair of angled coulters 5. Seed from the hopper 11 passes via a metering mechanism (not shown) down the seed tube 12 and into the slit thus formed.

Figure 2:
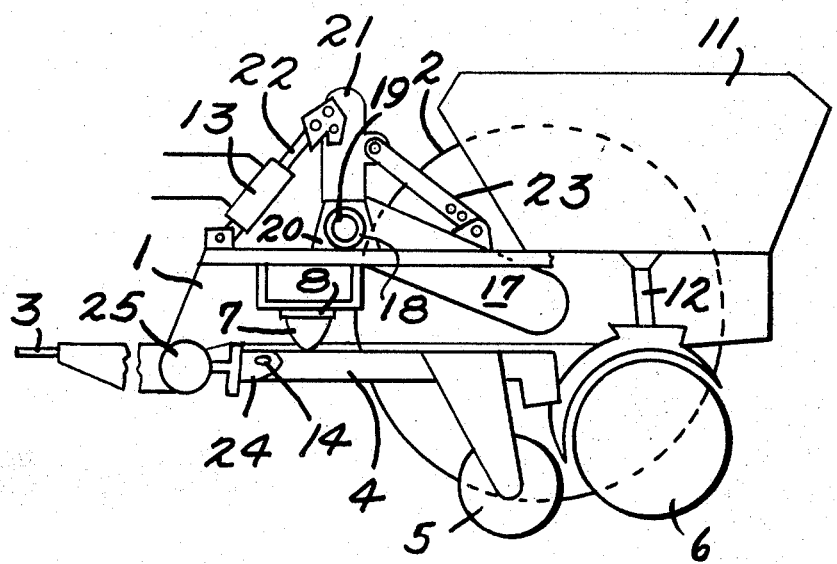
FIG. 2 is a schematic side view of a seed drill in which a rubber spring is fixed on the frame and bears on a drag arm.

Referring now to FIG. 2, numerals 1 to 8 have the same significance as in FIG. 1. The drag bars, one of which is shown at 4 in Fig. 2 may each be mounted between the pair of brackets 24 with a bolt 14 secured with a split pin. The brackets are mounted on a cross member 25 which is part of the frame 1. The conical rubber spring 7 is mounted on a bracket 9, which in turn is mounted on the frame 1. The spring 7 bears on the drag bar 4. As in the previously described construction, a hopper 11 is mounted above the coulters 6 and has a seed tube 12 opening between the coulters 6. The ground wheels 2 are mounted so as to be capable of being moved up and down relative to the frame 1, the movement being brought about by means of a pair of hydraulic cylinders, one of which is shown at 13 in FIG. 2, actuated by the tractor power supply. The hydraulic cylinders 13 may be arranged as follows, for example: each ground wheel 2 is located by means of a stub axle onto one end of an arm 17, the other end of which is fixed to a rotatable shaft 18 positioned cross-wise on the frame 1 by means of sleeves 19 mounted in upstanding bracket 20. Any suitable means such as lug 21 may be rotatably mounted upon shaft 18 and may be coupled on one side to the piston rod 22 of a hydraulic cylinder 13 and on the other side to adjustable link 23 which is connected to arm 17 by a pin mounted to arm 17 by a bracket secured thereto and placed in register with and extending through one of the plurality of apertures in link 23 to control the extent of rotation of the stub axle of the ground wheels about the shaft 18. In use, the ground wheels 2 are moved upwards relative to the frame 1 so that the coulters 5 and 6 come into engagement with the soil, loading being imposed on the coulters by the weight of the drill pressing on the drag arm 4 through the spring 7. The loading of the couters can be adjusted by moving the ground wheels 2 up or down so as to allow more or less of the weight of the drill to be applied to the spring 7. When the seed drill is to be transported to another site, the ground wheels are lowered relative to the frame so as to raise the coulters clear of the ground.

The above specific description is by way of example only and many possible modifications will be apparent. The amount of torque applied to the drag bar may, for example, conveniently be varied by placing the spring 7 at various distances along the drag bar with respect to the pivot point.

Several advantages flow from the use of a rubber spring. Firstly, the spring is much less bulky than a coil spring, and does not require such an elaborate superstructure to mount it. The simplification in construction which results from the use of this type of spring facilitates both the manufacture of the apparatus, and the replacement of the spring, for example with a spring of differing characteristics, when this is required. Another advantage, particularly when a concial rubber spring is employed, is that the spring is a variable rate spring; compression is at first relatively easy, but becomes progressively more difficult. In consequence, one spring is suitable for use with a wide variety of soils, so that by comparison with a coil spring, it is not so often necessary to exchange the spring for one of a different rating. A further advantage is that the rubber spring, unlike metal coil springs, is not subject to corrosion, which can be caused, for example, by spillage of fertilizers.

The greater compactness of construction achieved by the use of a rubber spring also enables the seed box to be mounted directly over the coulters and at a lower elevation than in seed drills where coil springs of conventional type are employed. A greater coulter stagger is also possible with this construction.

What is claimed is:

1. A seed drill comprising a frame mounted upon ground wheels, said frame having mounted thereon a seed hopper to which conduit means for conveying seed from the hopper to the ground is attached, said frame also supporting a plurality of drag bars bearing soilworking members, said drag bars being pivotally mounted on said frame, a conically shaped rubber spring having an apex and a base, said base of said rubber spring being fixed on said frame with said apex of said rubber spring being disposed to transmit a portion of the weight of said frame to a said drag bar, a said rubber spring being provided on said frame for each of said drag bars, the remainder of the weight of said frame being born by said ground wheels and frame-mounted means for moving said ground wheels vertically with respect to said frame for varying the portion of the weight of said frame born by said drag bars and thereby controlling the depth to which said soilworking members are urged into said soil, said frame-mounted moving means comprising at least a first member to one end of which at least one of said ground wheels is mounted, the other end of said first member being pivotally mounted at its other end to said frame, a lug member also pivotally mounted to said frame and connected to said first member by connecting means and a hydraulic cylinder mounted to said frame and having a piston attached to said lug member for rotating said lug member and therefore said first member 2. The seed drill recited in claim 1 wherein said connecting means is adjustable.

3. A seed drill comprising a frame mounted upon ground wheels, said frame having mounted thereon a seed hopper to which conduit means for conveying seed from the hopper to the ground is attached, said frame also supporting a plurality of drag bars bearing soil-working members, said drag bars being pivotally mounted on said frame, rubber spring means fixed on said frame for transmitting a portion of the weight of said frame to said drag bars, the remainder of the weight of said frame being born by said ground wheels and frame-mounted means for moving said ground wheels vertically with respect to said frame for varying the portion of the weight of said frame born by said drag bars and thereby controlling the depth to which said soil working members are urged into said soil, said moving means including at least a first member at one end of which at least one of said ground wheels is mounted, the other end of said member being pivotally mounted to said frame, a lug member also pivotally mounted to said frame and connected to said first member by connecting means and a hydraulic cylinder mounted to said frame and having a piston attached to said lug member for rotating said lug member and therefore said first member, said connecting means being adjustable and including a link member having a plurality of apertures, a bracket secured to said first member having an aperture and a fastening member adapted to fit through said aperture in said link member and said bracket to connect said link member to said bracket.

4. A seed drill comprising a frame mounted upon ground wheels, said frame having mounted thereon a seed hopper to which conduit means for conveying seed from the hopper to the ground is attached, said frame also supporting a plurality of drag bars bearing soilworking members, said drag bars being pivotally mounted on said frame, a conically shaped rubber spring having an apex and a base positioned between the frame and a drag bar with the base in contact with the frame and the apex in contact with the bar so as to transmit a portion of the weight of said frame to said drag bar, a said rubber spring being provided on said frame for each of said drag bars, the remainder of the weight of said frame being born by said ground wheels and frame-mounted means for moving said ground wheels vertically with respect to said frame for varying the portion of the weight of said frame born by said drag bars and thereby controlling the depth to which said soilworking members are urged into said soil, said frame-mounted moving means comprising at least a first member to which at least one of said ground wheels is connected, said first member being pivotally mounted to said frame, and further means also pivotally mounted on said frame and connected to said first member and hydraulically operated means mounted on said frame and operatively associated with said further means for rotating said further means and therefore said first member.

* * * * *